United States Patent
Lubow

(10) Patent No.: US 7,337,972 B2
(45) Date of Patent: Mar. 4, 2008

(54) SYSTEM AND METHOD FOR EMBEDDING CHARACTERS IN A BAR OF A BAR CODE

(75) Inventor: Allen Lubow, Brooklyn, NY (US)

(73) Assignee: International Barcode Corporation, New York, NY (US)

( * ) Notice: Subject to any disclaimer, the term of this patent is extended or adjusted under 35 U.S.C. 154(b) by 173 days.

(21) Appl. No.: 10/495,034

(22) PCT Filed: Nov. 12, 2002

(86) PCT No.: PCT/US02/36371

§ 371 (c)(1),
(2), (4) Date: Nov. 4, 2004

(87) PCT Pub. No.: WO03/040804

PCT Pub. Date: May 15, 2003

(65) Prior Publication Data

US 2005/0161515 A1      Jul. 28, 2005

Related U.S. Application Data

(60) Provisional application No. 60/347,561, filed on Nov. 9, 2001.

(51) Int. Cl.
G06K 7/10      (2006.01)
G06K 9/22      (2006.01)

(52) U.S. Cl. .............................. 235/462.25; 235/462.01

(58) Field of Classification Search ........... 235/462.25, 235/462.01, 462.1
See application file for complete search history.

(56) References Cited

U.S. PATENT DOCUMENTS

| 4,590,366 A | 5/1986 | Rothfjell |
| 4,777,357 A | 10/1988 | Harada et al. |
| 4,795,281 A | 1/1989 | Ulinski, Sr. et al. |
| 4,811,408 A | 3/1989 | Goldman |
| 4,889,367 A * | 12/1989 | Miller .......................... 283/88 |
| 5,235,167 A * | 8/1993 | Dvorkis et al. ........ 235/462.21 |
| 5,337,361 A | 8/1994 | Wang et al. |
| 5,522,623 A | 6/1996 | Soules et al. |
| 5,563,401 A | 10/1996 | Lemelson |
| 5,841,886 A | 11/1998 | Rhoads |
| 5,913,542 A | 6/1999 | Belucci et al. |
| 5,971,587 A | 10/1999 | Kato et al. |
| 6,032,861 A * | 3/2000 | Lemelson et al. .......... 235/456 |
| 6,100,804 A | 8/2000 | Brady et al. |
| 6,318,636 B1 | 11/2001 | Reynolds et al. |

(Continued)

FOREIGN PATENT DOCUMENTS

| EP | 0921675 A2 | 6/1999 |
| JP | 9-231338 | 9/1997 |
| WO | WO 01/67375 A1 | 9/2001 |
| WO | WO 03/040804 | 5/2003 |
| WO | WO 03/049007 | 6/2003 |

OTHER PUBLICATIONS

International Search Report and Written Opinion mailed Oct. 24, 2005 in corresponding International Application No. PCT/US04/41084.

(Continued)

*Primary Examiner*—Daniel Stcyr
(74) *Attorney, Agent, or Firm*—Davidson Berquist Jackson & Gowdey LLP

(57) ABSTRACT

The present invention provides for widening a single bar (18) of a bar code without spoiling the readability of the bar code symbol. Further, the present invention provides for writing at least one sufficiently small letter, icon or other character within a single bar (24, 26) or space (22) of a bar code symbol without spoiling the symbol's readability.

13 Claims, 5 Drawing Sheets

U.S. PATENT DOCUMENTS

| | | |
|---|---|---|
| 6,342,839 B1 | 1/2002 | Curkendall et al. |
| 6,354,494 B1 | 3/2002 | Marcus |
| 6,409,401 B1 | 6/2002 | Petteruti et al. |
| 6,415,978 B1 | 7/2002 | McAllister |
| 6,463,039 B1 | 10/2002 | Ricci et al. |
| 6,494,367 B1 | 12/2002 | Zacharias |
| 6,614,392 B2 | 9/2003 | Howard |
| 6,616,047 B2 | 9/2003 | Catan |
| 6,637,649 B2 | 10/2003 | Walsh |
| 6,646,554 B1 | 11/2003 | Goff et al. |
| 6,685,094 B2 | 2/2004 | Cameron |
| 7,025,269 B2 * | 4/2006 | Marshall ................ 235/462.01 |
| 2001/0045460 A1 | 11/2001 | Reynolds et al. |
| 2004/0000787 A1 | 1/2004 | Vig et al. |
| 2005/0072846 A1 | 4/2005 | Lubow |
| 2005/0109846 A1 | 5/2005 | Lubow |
| 2005/0161512 A1 | 7/2005 | Jones et al. |
| 2005/0161515 A1 | 7/2005 | Lubow |
| 2005/0199723 A1 | 9/2005 | Lubow |

OTHER PUBLICATIONS

International Search Report mailed Apr. 10, 2003 in International Application No. PCT/US02/36371.
International Search Report mailed Apr. 8, 2003 in corresponding International Application No. PCT/US02/38558.
Office Action mailed Dec. 23, 2005 in corresponding European Application No. 02791236.9-2210.
Office Action mailed Jun. 3, 2005 in corresponding European Application No. 02791236.9-2210.
Supplemental European Search Report issued Mar. 8, 2005 in corresponding European Applcation No. 02791236.9-2210.
Supplemental European Search Report mailed Jan. 23, 2007, in corresponding European Application No. 02786862.9-2211.
International Search Report and Written Opinion mailed Apr. 25, 2006 in corresponding International Application PCT/US2005/029684.

* cited by examiner

Background Art

SYSTEM AND METHOD FOR EMBEDDING CHARACTERS IN A BAR OF A BAR CODE

CROSS-REFERENCE TO RELATED APPLICATION

This application is based upon and claims priority to U.S. provisional patent application Ser. No. 60/347,561 filed Nov. 09, 2001 and entitled SYSTEM AND METHOD FOR EMBEDDING CHARACTERS IN A BAR OF A BAR CODE, the entire contents of which is hereby incorporated by reference.

FIELD OF THE INVENTION

The present invention relates to a system and method to place information in a bar code and, more particularly, provides for embedding at least one character or symbol in a bar of a bar code without affecting the ability of the bar code to be interpreted by a bar code reading device.

BACKGROUND OF THE INVENTION

Bar codes contain information in the bars and spaces that is interpreted by electronic devices, referred to herein as bar code reading devices. A bar code reading device, including, for example, a scanner, wand, optical scanner or verifier, reads the bars and spaces by measuring their widths and decoding the dimensions according to the rules of the particular bar code, known as its "symbology." A bar code symbology is a set of encoding algorithms that essentially provide the grammar for the production of the bar code pattern. As in written languages, bar code symbologies have rules of grammar that dictate how the pattern of bars and spaces are formed for any particular code data. Examples of recognized bar code symbologies include UCC/EAN 128, Codabar, Code 128, Code 39, Code 93, UPC-A, UPC-E, JAN-13, ITF, ISSN, ITF and ISBN. Typically, a bar code reading device determines the differences between the thickness of the bars and the thickness of the spaces by counting light and dark pulses of light as the reading device is drawn across the bars.

Most goods are marked with at least one bar code. In addition to the bar code, another character or image, such as a company logo or other trademark, may be placed on the good. This character or image frequently represents the source of the good. For example, a telephone made by AT&T has the AT&T logo printed on the telephone, and the telephone also comprises a barcode that contains information directed to the telephone, for example, the telephone model number. Placing both a bar code and/or a separate identifying or other human recognizable icon on a good is expensive. For example, two printing processes must be performed, and two separate tasks are required to place the bar code and the icon separately on the good.

Alternatively, some goods are marked with a bar code and no other identifying elements. In such cases, the source of the good, therefore, cannot be discerned by an intended purchaser or user with the aid of a bar code reading device. The bar code itself may identify the product and its source, but that is not discernable without a bar code reading device.

Among the most common bar code symbologies in the U.S. and Canada is the Universal Product Code (UPC-A). As shown in FIG. 1, a UPC-A bar code symbol's pattern of bars and spaces is a unit bar 10. Unit bar 10 is a narrow bar having a predetermined width for a bar code symbol at a given magnification. The dimensions of the bars and spaces in the symbol are exact multiples of the unit bar. Thus, double bar 12 in the symbol is twice as wide as unit bar 10, while triple bar 14 is three times as wide and quadruple bar 16 is four times as wide.

Each bar code symbol begins and ends with start and stop characters, referred to herein as frame bars. Frame bars are unique to the symbology involved and instruct a bar code reading device what symbology to expect when reading the symbol. The frame bars in the symbol shown in FIG. 1 are composed of unit bars 10.

In an ideal UPC symbol, the unit bar has a predetermined thickness and all other bars and the spaces therebetween have thicknesses that are exact multiples of the unit bar thickness. If, therefore, when a UPC symbol is printed on one or more bars and found to be thicker or thinner than the thickness of the unit bar of the ideal symbol, then the dimensions of the bars and spaces which make up the symbol correspondingly deviate from those of the ideal symbol.

For each bar code symbology, there are published specifications to provide instructions for those producing bar codes. ANSI standards are widely regarded as the accepted standard for each symbology. Bar code systems are issued with the instructions so that all participants will conform to the published standards. In order to measure how closely a bar code symbol meets these standards, electronic verifiers can be used.

Whether a bar code symbol can be read depends, in part, on the ability of a bar code reading device to measure the relative widths of the bars and spaces of a bar code. The ability of a bar code reader to discern the relative widths of the bars and spaces may depend on increments as small as $\frac{1}{10,000}$th of an inch. A misprinted bar code symbol can be rendered unreadable by bar code reading devices because of defects occurring during the production of the bar code, for example, the printing process. For example, ink spots, voids, smudges and the like in a bar code can render the bar code unreadable.

Symbologies that use only two thicknesses of bars and spaces set a value for thick bars and spaces in comparison to thin ones. This is known in the industry as scaling and represents a wide/narrow ratio. For example, a wide/narrow ratio of 2:1 indicates that a wide bar has twice the width of a thin bar. If a printer has a dot size of $\frac{1}{12}$th inch wide, six dots are required to print a half-inch image, and 12 dots to produce a one inch image. The image, therefore, requires a multiple of six dots, no matter how wide the image is printed. If a bar code requires $\frac{3}{4}$ of an inch for a wide bar, the wide/narrow ratio suffers because the printer in this example is unable to print a pattern of $\frac{3}{4}$ inches and maintain the same wide/narrow ratio. Since such a printer only prints whole dots, improper scaling results in problems with the bar code's production and readability.

Some of the more serious bar code printing problems are caused by the physical properties of ink on various substrates. Due to the viscosity of ink and the porosity of different kinds of paper, images tend to more or less spread. The spread caused by the ink or paper is called print gain. Print gain results in bars being printed too thickly and the intervening spaces become too thin, thereby distorting the dimensions of the symbol and impairing its readability by a scanner.

Print gain may cause enormous dimensional changes, for example, by doubling the width of printed bars. A very thin ink on a nonporous, glossy substrate may cause print gains of 50% to 100% or more. To overcome the problem of print gain, bar code designers use a technique known in the industry as "bar width reduction." The technique of bar width reduction involves reducing printed bars in anticipation of an expected print gain. By reducing the width of the bars, bar code reading devices should be able to interpolate the data in the bar code symbol on the substrate.

Print gain may occur repeatedly during a production process. Many operations, e.g., image setting, typesetting, scanning, producing plates, and pre-press operations can contribute to print gain. The press run may contribute the most to print gain. Moreover, the different production processes may counteract each other, thus the effects of one process may be negated by another. Alternatively, the effects of the processes are cumulative, compounding one process's print gain upon another's.

Notwithstanding a poorly produced bar code, the information embedded therein may still be readable by a bar code reading device. Many bar code symbologies afford a degree of tolerance with respect to the production quality of a bar code. For example, the Code 39 bar code symbology permits up to 50% of a single bar to be not perfectly black. As long as the bar remains within the tolerance level of the symbology, for example, is at least 50% black for Code 39, the bar code remains readable by a bar code reading device. Another kind of tolerance of a bar code symbology includes allowing for a hole or other void within a bar. So long as the void is sufficiently small, the bar code is still readable by a bar code reading device.

Moreover, an averaging technique is employed by many bar code reading devices that enables the devices to interpret a bar code that is not perfectly produced. For example, a typical UPC-A bar code with thirty bars and 29 spaces yields 670 dots with a handheld scanner. This averages to eleven dots per unit bar. However, if one is trying to determine whether a 13 millimeter bar is 12 or 14 millimeters thick, the eleven dots per unit bar provide insufficient information. To compensate for this lack of information, well-known averaging techniques are employed to extract the information contained in the bar code. Prior art averaging techniques are useful to extract information in bar codes that have a scaling problem.

SUMMARY OF THE INVENTION

The present invention serves to provide information to a user, and to save time and money by embedding at least one human readable or recognizable character in a bar code, particularly within a bar of the bar code, without affecting the ability of the bar code to be interpreted by a bar code reading device. This reduces the amount of additional space required by prior art methods to place a bar code and a separate human readable or recognizable character on a good. By taking advantage of a range of imperfection allowed by a given symbology, a character, for example, a company logo or a human readable character, is preferably embedded in the bar code symbol by the present invention.

By embedding a letter, icon or other mark in the bar code, particularly in a bar of the bar code, the present invention saves physical space, time and financial costs associated with prior art techniques of placing a bar code separately from an identifying insignia and accessing and assessing both indicators of information.

Moreover, by embedding a letter, icon or other mark in a bar of a bar code, additional information can be stored in the bar code. That information can be readily interpreted without the aid of a bar code reading device.

Alternatively, a character, letter, icon or other mark can be embedded in a space of a bar code. Since the tolerance levels provided by different symbologies are not limited only to bars, the present invention preferably utilizes the range of imperfection allowed for either bars or spaces to embed additional information therein.

In accordance with the present invention, the degree of deficiency in a bar code that is permissible using prior art averaging techniques is used to develop poorly scaled bar code symbols that nevertheless pass verification. In a preferred embodiment of the present invention, one bar of a bar code is made wider than it would ordinarily appear. Since prior art averaging techniques tolerate dimensional errors, the bar code symbol falls within an acceptable tolerance and the information contained therein is still interpretable. Having this thickened bar allows for embedding an icon, letter or other character within the bar by the present invention.

Alternatively, the present invention preferably takes advantage of prior art averaging techniques to embed a mark, icon, letter or other character in a space of a bar code. Preferably, one or more spaces of a bar code symbol is widened within an acceptable range in order to support the additional information.

BRIEF DESCRIPTION OF THE DRAWINGS

For the purposes of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which.

DETAILED DESCRIPTION OF EMBODIMENTS OF THE INVENTION

The present invention is directed to embedding a letter, icon or other mark in a bar code, particularly in a bar of a bar code and possibly in a space between bars of the code, without rendering that bar code unreadable by a bar code reading device.

Figure 1:
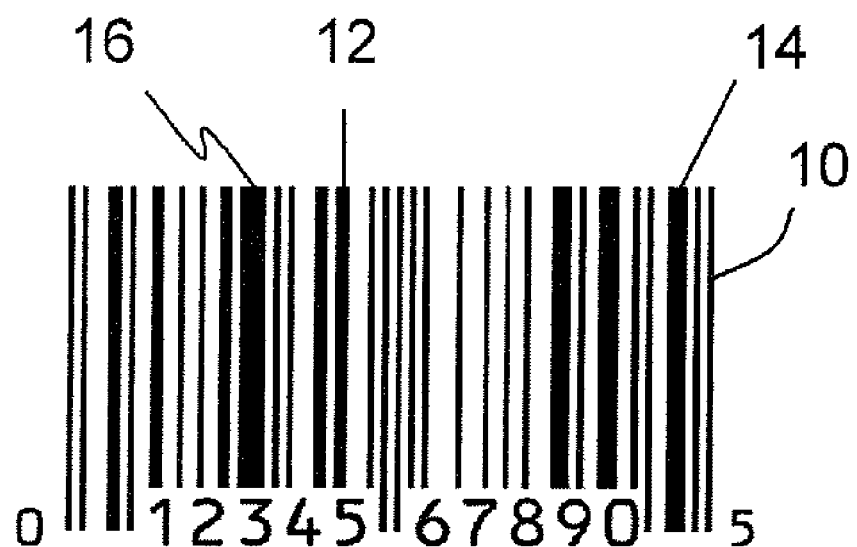
FIG. 1 shows a typical UPC bar code symbol.
Figure 2:
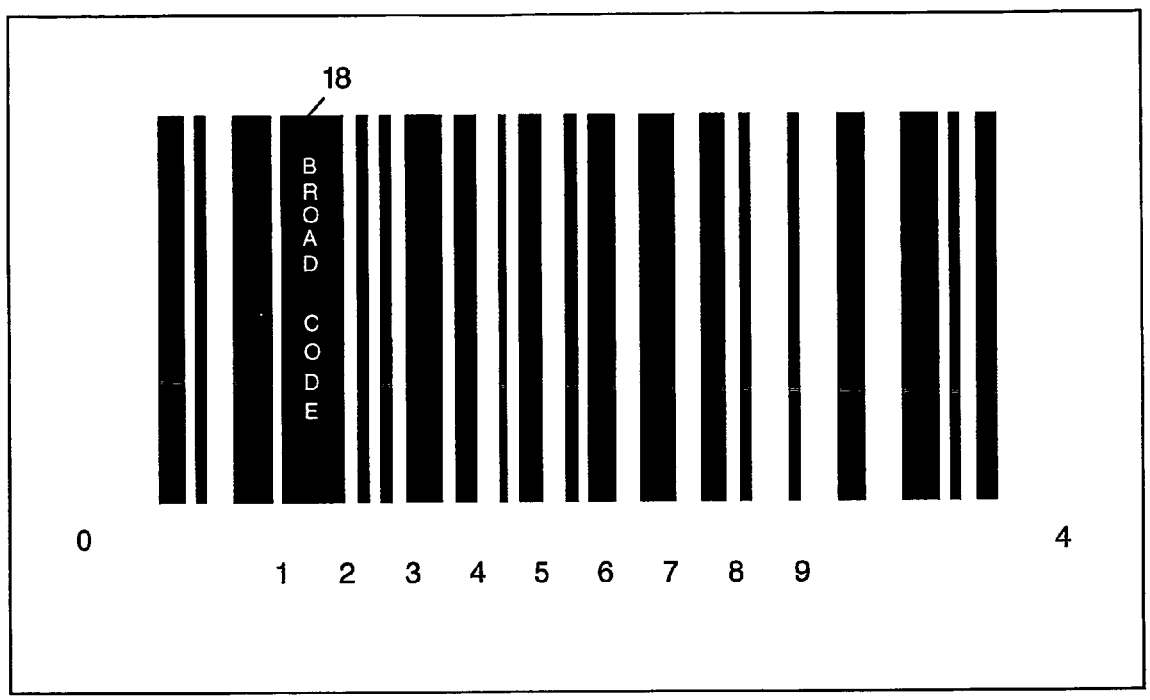
FIG. 2 shows a typical UPC bar code with human readable characters embedded in one of the bars.

FIG. 2 illustrates a typical UPC bar code symbol that has a bar widened to support characters therein. The thickest bar 18 of the bar code, is widened within a degree of acceptable tolerance with respect to an averaging technique employed by a bar code reading device. As shown in the example in FIG. 2, the words, "BROAD CODE" are embedded in the widened bar 18, while the bar code remains readable to a bar code reading device.

Figure 3:
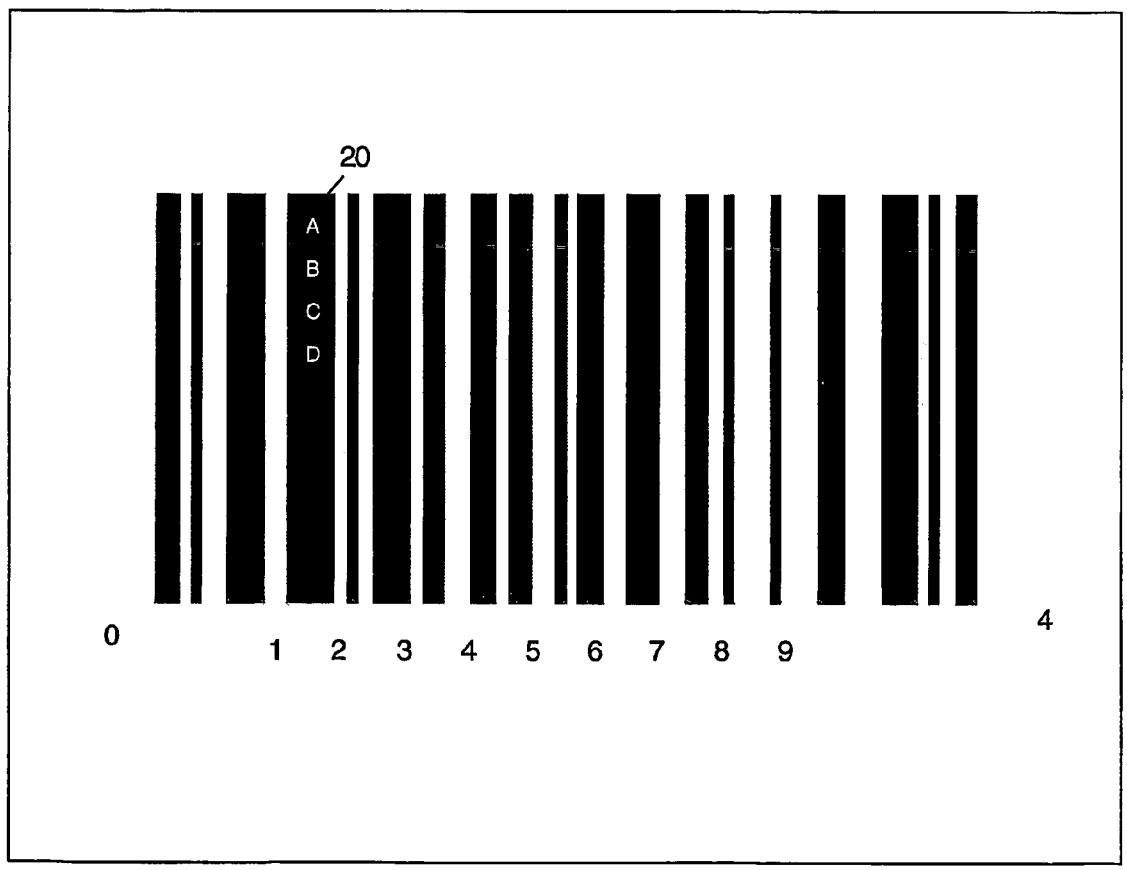
FIG. 3 shows a typical UPC bar code with human readable characters embedded in an intentionally widened bar.

FIG. 3 shows an alternative embodiment of the present invention. As shown therein, the letters, "A B C D" are embedded in bar 20. In the example shown in FIG. 3, the bar code symbol remains readable by a bar code reading device because the letters are sufficiently small. By embedding a sufficiently small letter, icon or other character in a bar of a bar code, the bar remains within an acceptable tolerance with respect to the bar code symbology, and the information contained in the bar code can be interpreted.

Figure 4:
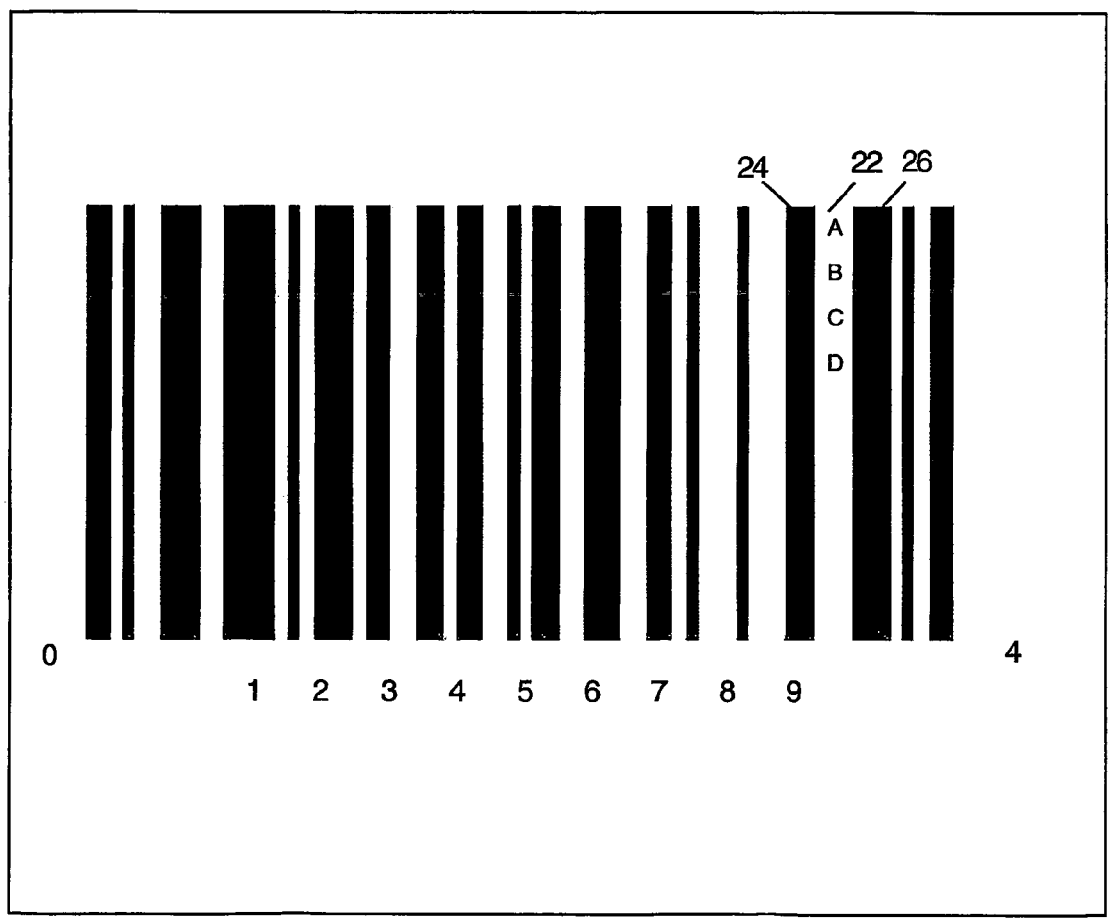
FIG. 4 shows an alternate arrangement with characters embedded in a space between bars.
Figure 5:
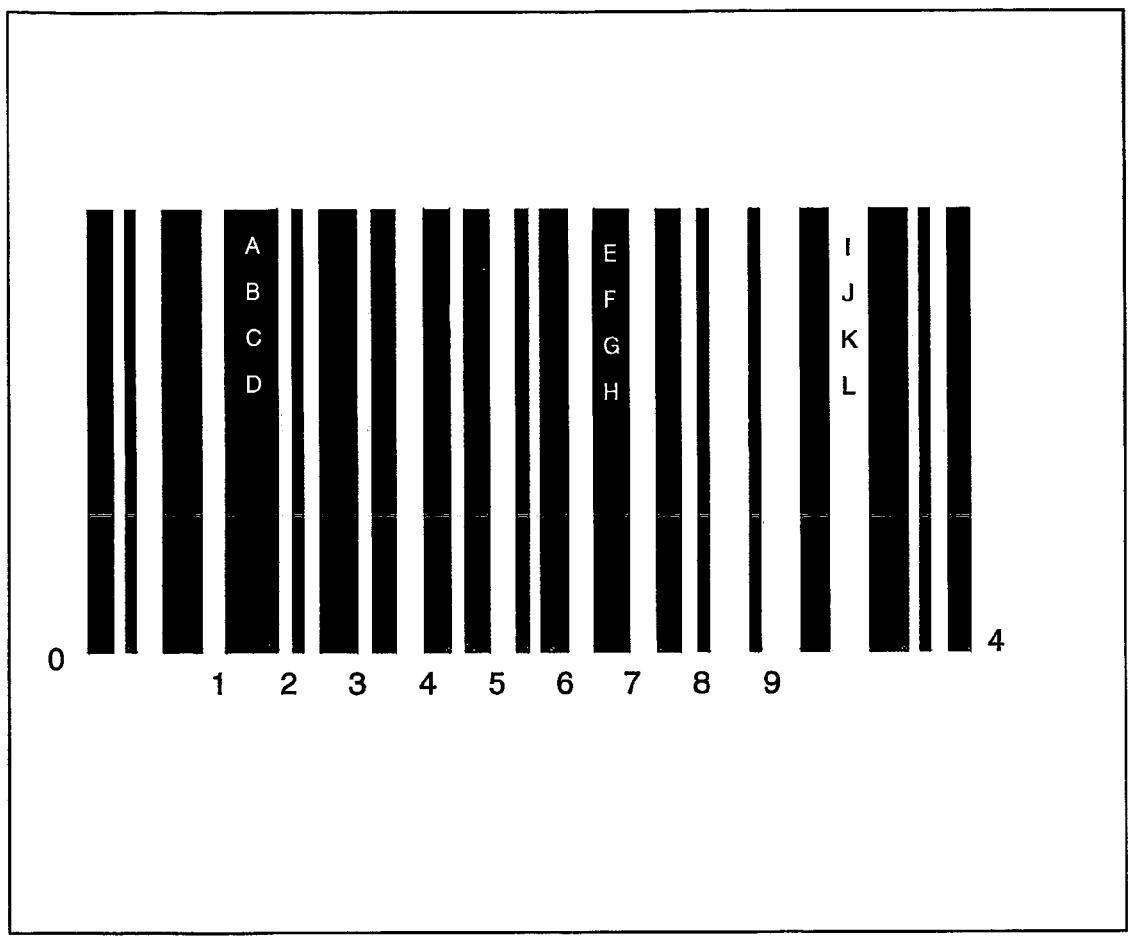
FIG. 5 shows another alternative with characters spanning several bars.

FIG. 4 illustrates an alternate design wherein a letter, icon or other mark is embedded in a space 22 between adjacent bars 24, 26. That same symbol may span both a bar and a space, as shown in FIG. 5 at 28, and even several bars and intervening spaces.

Thus, the present invention provides for embedding additional information, preferably human recognizable, in a bar code symbol. Since many bar code symbologies allow for some degree of imperfection in the bars and/or spaces, the present invention preferably utilizes each symbology's relative degree of tolerance to embed additional information, for example, a letter, icon or other mark in the bar code symbol. The additional information may be embedded in a space between two of the bars or even may span a bar and an adjacent space.

Alternatively, a single bar or space is widened to support additional information, for example, a letter, icon or other mark in the bar code symbol. By understanding the deficiencies allowed by prior art averaging techniques, bar code symbols are intentionally modified by the present invention that are still verifiable and readable by a bar code reading device. Here, too, different symbologies provide for different degrees averaging techniques to tolerate bar code imperfection.

Although the present invention has been described in relation to particular embodiments thereof, many other variations and modifications and other uses will become apparent to those skilled in the art. Therefore, the present invention is not limited by the specific disclosure.

What is claimed is:

1. A method for generating a bar code symbol, the method comprising:
    generating said bar code symbol to be compliant with a recognized bar code symbology, said bar code symbol having at least one bar and at least one space and containing information therein;
    determining an acceptable degree of tolerance afforded by said bar code symbology as a function of at least one imperfection in said bar code symbol; and
    embedding at least one letter entirely within at least one of said bar and said space without said at least one letter extending outside of said at least one of said bar and said space, wherein said at least one letter is of a sufficient size to maintain said bar code symbol within said acceptable degree of tolerance, and said at least one letter is not included in said bar code symbology.

2. The method of claim 1, wherein said at least one imperfection comprises at least one of print gain, a void, smudging, scaling, lightness and contrast.

3. The method of claim 1, wherein said bar code symbology is at least one of a UCC/EAN 128, Codabar, Code 128, Code 39, Code 93, UPC-A, UPC-E, JAN-13, ITF, ISSN, ITF and ISBN.

4. A method for generating a bar code symbol, the method comprising:
    generating said bar code symbol to be compliant with a recognized bar code symbology, said bar code symbol having at least one bar and at least one space and containing information therein;
    determining an averaging technique employed by a bar code reading device;
    widening at least one of said bar and said space; and
    embedding at least one letter entirely within said at least one widened bar and widened space without said at least one letter extending outside of said at least one widened bar and widened space, wherein said at least one widened bar and widened space is widened to a sufficient size as to enable said bar code symbol to be interpreted by said bar code reading device employing said averaging technique.

5. The method of claim 4, wherein said bar code symbology is at least one of a UCC/EAN 128, Codabar, Code 128, Code 39, Code 93, UPC-A, UPC-E, JAN-13, ITF, ISSN, ITF and ISBN.

6. A system for generating a bar code symbol, the system comprising:
    a bar code symbol generating module, wherein said bar code symbol generating module creates said bar code symbol that is compliant with a recognized bar code symbology, said bar code symbol having at least one bar and at least one space and containing information therein;
    a tolerance determining module, wherein said tolerance determining module assesses an acceptable degree of tolerance afforded by said bar code symbology as a function of at least one imperfection in said bar code symbol; and
    a letter embedding module, said letter embedding module places at least one letter entirely within at least one of said bar and said space without said at least one letter extending outside of said at least one of said bar and said space, wherein said at least one letter is of a sufficient size to maintain said bar code symbol within said acceptable degree of tolerance, and said at least one letter is not included in said bar code symbology.

7. The system of claim 6, wherein said at least one imperfection comprises at least one of print gain, a void, smudging, scaling, lightness and contrast.

8. The system of claim 6, wherein said bar code symbology is at least one of a UCC/EAN 128, Codabar, Code 128, Code 39, Code 93, UPC-A, UPC-E, JAN-13, ITF, ISSN, ITF and ISBN.

9. A system for generating a bar code symbol, the system comprising:
    a bar code symbol generating module, wherein said bar code symbol generating module creates said bar code symbol to be compliant with a recognized bar code symbology, said bar code symbol having at least one bar and at least one space and containing information therein;
    an averaging technique determining module, wherein said averaging technique determining module employs an averaging technique used by a bar code reading device;
    a bar widening module, wherein said bar widening module increases the width of at least one of said bar and said space; and
    a letter embedding module, wherein said letter embedding module places at least one letter entirely within said at least one widened bar and widened space without said at least one letter extending outside of said at least one widened bar and widened space, and wherein said at least one widened bar and widened space is widened to a sufficient size as to enable said bar code symbol to be interpreted by said bar code reading device employing said averaging technique.

10. The method of claim 9, wherein said bar code symbology is at least one of a UCC/EAN 128, Codabar, Code 128, Code 39, Code 93, UPC-A, UPC-E, JAN-13, ITF, ISSN, ITF and ISBN.

11. A method for generating a bar code symbol, the method comprising:

generating said bar code symbol to be compliant with a recognized bar code symbology, said barcode symbol having at least one bar and at least one space and containing information therein;

determining an acceptable degree of tolerance afforded by said bar code symbology as a function of at least one imperfection in said bar code symbol; and embedding at least one letter entirely within a space of said at least one space without said at least one letter extending outside of said at least one space, wherein said at least one letter is of a sufficient size to maintain said bar code symbol within said acceptable degree of tolerance, and said at least one letter is not included in said bar code symbology.

12. The method of claim 11, wherein said at least one imperfection comprises at least one of print gain, a void, smudging, scaling, lightness and contrast.

13. The method of claim 11, wherein said bar code symbology is at least one of a UCC/EAN 128, Codabar, Code 128, Code 39, Code 93, UPC-A, UPC-E, JAN-13, ITF, ISSN, ITF and ISBN.

* * * * *